US009518491B2

(12) United States Patent
Tsutsumi et al.

(10) Patent No.: US 9,518,491 B2
(45) Date of Patent: Dec. 13, 2016

(54) CONSTRUCTION MACHINE

(71) Applicant: KOMATSU LTD., Minato-ku, Tokyo (JP)

(72) Inventors: Katsuhiro Tsutsumi, Hitachinaka (JP); Hirofumi Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/404,323

(22) PCT Filed: Jun. 19, 2013

(86) PCT No.: PCT/JP2013/066814
§ 371 (c)(1),
(2) Date: Nov. 26, 2014

(87) PCT Pub. No.: WO2014/007060
PCT Pub. Date: Jan. 9, 2014

(65) Prior Publication Data
US 2015/0167523 A1    Jun. 18, 2015

(30) Foreign Application Priority Data
Jul. 5, 2012    (JP) .................. 2012-151163

(51) Int. Cl.
*F01N 3/00*    (2006.01)
*F01N 3/02*    (2006.01)
(Continued)

(52) U.S. Cl.
CPC .............. *F01N 3/206* (2013.01); *B60K 13/04* (2013.01); *E02F 9/0866* (2013.01); *F01N 3/021* (2013.01);
(Continued)

(58) Field of Classification Search
CPC . B60K 13/04; B60Y 2200/412; F01N 13/009; F01N 13/011; F01N 13/08; F01N 13/1805; F01N 13/1816; F01N 13/1822; F01N 3/021; F01N 3/035; F01N 3/10; F01N 3/206; F01N 3/2066; F01N 3/2882; F01N 2590/08; F01N 2470/18; F01N 2340/04; Y02T 10/20
See application file for complete search history.

(56) References Cited

U.S. PATENT DOCUMENTS

| 4,137,983 A | 2/1979 | Gray |
| 4,355,944 A * | 10/1982 | Lorenc .................... E02F 3/388 298/17 B |

(Continued)

FOREIGN PATENT DOCUMENTS

| CN | 102046932 A | 5/2011 |
| JP | 2007331602 A | 12/2007 |

(Continued)

OTHER PUBLICATIONS

Japanese Office Action dated Oct. 28, 2014, issued in counterpart Japanese Application No. 2013-556699.
(Continued)

*Primary Examiner* — Thomas Denion
*Assistant Examiner* — Diem Tran
(74) *Attorney, Agent, or Firm* — Holtz, Holtz & Volek PC (57) ABSTRACT

An exhaust gas aftertreatment device provided to an upper portion of an engine includes a right and left pair of first and second aftertreatment units, into which exhaust gas from the engine dividedly flows, each including a first exhaust gas emission control system on an upstream side, a second exhaust gas emission control system on a downstream side and a communication pipe through which the first and second systems are in communication with each other, the first and second systems, while being arranged side by side in a right-and-left direction, being oriented so that a flow direction of the exhaust gas flowing therein is parallel with (Continued)

a front-and-rear direction. When the device is seen in the front-and-rear direction, an outer linear envelope tangent to the first system and the communication pipe of each of the units extends upward while tilting toward a right-and-left center of the engine.

5 Claims, 5 Drawing Sheets (51) Int. Cl.
| | |
|---|---|
| *F01N 3/10* | (2006.01) |
| *F01N 3/20* | (2006.01) |
| *B60K 13/04* | (2006.01) |
| *E02F 9/08* | (2006.01) |
| *F01N 3/021* | (2006.01) |
| *F01N 13/00* | (2010.01) |
| *F01N 13/08* | (2010.01) |
| *F01N 13/18* | (2010.01) |
| *F01N 3/035* | (2006.01) |
| *F01N 3/28* | (2006.01) |

(52) U.S. Cl.
CPC ............... *F01N 3/10* (2013.01); *F01N 13/009* (2014.06); *F01N 13/011* (2014.06); *F01N 13/08* (2013.01); *F01N 13/1805* (2013.01); *F01N 13/1816* (2013.01); *F01N 13/1822* (2013.01); *B60Y 2200/412* (2013.01); *F01N 3/035* (2013.01); *F01N 3/2066* (2013.01); *F01N 3/2882* (2013.01); *F01N 2340/04* (2013.01); *F01N 2470/18* (2013.01); *F01N 2590/08* (2013.01); *Y02T 10/20* (2013.01)

(56) References Cited

U.S. PATENT DOCUMENTS

| | | | | |
|---|---|---|---|---|
| 6,620,391 | B2* | 9/2003 | Muller | B01D 53/8631 423/210 |
| 7,430,855 | B2* | 10/2008 | Amemiya | F01N 1/084 60/286 |
| 7,797,928 | B2* | 9/2010 | Friedrich | F01N 3/0222 60/274 |
| 8,015,802 | B2* | 9/2011 | Nishiyama | B01D 53/9431 60/286 |
| 2003/0108457 | A1* | 6/2003 | Gault | F01N 3/0211 422/177 |
| 2008/0314033 | A1 | 12/2008 | Aneja et al. | |
| 2009/0293467 | A1 | 12/2009 | Boeckenhoff | |
| 2010/0000203 | A1 | 1/2010 | Kowada | |
| 2010/0031644 | A1 | 2/2010 | Keane et al. | |
| 2010/0178216 | A1 | 7/2010 | Honda et al. | |
| 2010/0186381 | A1 | 7/2010 | Charles et al. | |
| 2010/0187383 | A1* | 7/2010 | Olsen | F01N 13/1805 248/201 |
| 2010/0218488 | A1 | 9/2010 | Yokota | |
| 2011/0030353 | A1 | 2/2011 | Kamiya et al. | |
| 2011/0079003 | A1 | 4/2011 | Sun et al. | |
| 2011/0180344 | A1 | 7/2011 | Kimura | |
| 2012/0247861 | A1 | 10/2012 | Mizuno et al. | |
| 2012/0260635 | A1 | 10/2012 | Aneja et al. | |
| 2013/0213726 | A1 | 8/2013 | Okada | |

FOREIGN PATENT DOCUMENTS

| | | |
|---|---|---|
| JP | 2008196328 A | 8/2008 |
| JP | 2009085065 A | 4/2009 |
| JP | 2009103016 A | 5/2009 |
| JP | 2010038019 A | 2/2010 |
| JP | 2010059749 A | 3/2010 |
| JP | 2010096153 A | 4/2010 |
| JP | 2011117385 A | 6/2011 |
| JP | 2012097413 A | 5/2012 |
| JP | 2013104394 A | 5/2013 |
| WO | 2011152306 A1 | 12/2011 |
| WO | 2012056643 A1 | 5/2012 |

OTHER PUBLICATIONS

International Search Report dated Aug. 20, 2013 issued in International Application No. PCT/JP2013/066814.
Japanese Office Action dated Aug. 5, 2014 issued in counterpart Japanese Application No. 2013-556699.
International Preliminary Report on Patentability (IPRP) including Written Opinion (in English) dated Jan. 6, 2015, issued in International Application No. PCT/JP2013/066814.
Extended European Search Report dated Feb. 3, 2016, issued in counterpart European Application No. 13813521.5.
Chinese Office Action (and English translation thereof) dated Mar. 15, 2016, issued in counterpart Chinese Application No. 201380022201.5.

\* cited by examiner

CONSTRUCTION MACHINE

TECHNICAL FIELD

The present invention relates to a construction machine. In particular, the present invention relates to a construction machine provided with an exhaust gas aftertreatment device including both a soot filter and a urea SCR (Selective Catalytic Reduction) device.

BACKGROUND ART

As generally known, a typical aftertreatment device for exhaust gas discharged from a diesel engine includes both a soot filter that collects particular matter in the exhaust gas and a urea SCR device that purifies a nitrogen oxide (NOx) in the exhaust gas with a urea solution (see, for instance, Patent Literature 1).

A diesel engine used in a construction machine has a large displacement as compared with that of a diesel engine used in a transport truck or the like, and thus requires a large-sized aftertreatment device capable of dealing with such a large displacement.

However, since an aftertreatment device is usually provided in an engine compartment of a construction machine, such a large-sized aftertreatment device cannot simply be installed due to a limited installation space. Accordingly, it is disclosed that a plurality of aftertreatment devices with a typical size are installed to ensure a sufficient performance, the aftertreatment devices being arranged in such a manner that a narrow space is efficiently used (see, for instance, Patent Literature 2).

CITATION LIST

Patent Literature(s)

Patent Literature 1: US Patent Application Publication No. 2010/0031644
Patent Literature 2: JP-A-2010-38019

SUMMARY OF THE INVENTION

Problem(S) to be Solved by the Invention

However, the exhaust gas aftertreatment devices installed in the engine compartment of the construction machine needs to set above the engine so as to be removable using a crane for the purpose of maintenance of the exhaust gas aftertreatment devices or the engine. Therefore, an installation space for the aftertreatment devices is limited and thus it is sometimes difficult to efficiently arrange the aftertreatment devices in a narrow space. Accordingly, the size of the engine compartment needs to be increased to a certain extent to install the aftertreatment devices. As a result, for instance, in a wheel loader with an engine compartment that is provided behind a cab, a rearward visibility from the cab becomes poor.

An object of the invention is to provide a construction machine in which an exhaust gas aftertreatment device capable of dealing with a large displacement can be installed while ensuring good visibility for an operator.

Means for Solving the Problem(s)

According to a first aspect of the invention, a construction machine includes: an engine that is oriented so that an axial direction of a crankshaft is parallel with a front-and-rear direction of a vehicle body; and an exhaust gas aftertreatment device that is provided to an upper portion of the engine, the exhaust gas aftertreatment device including at least one pair of a first aftertreatment unit and a second aftertreatment unit into which exhaust gas from the engine dividedly flows, the first aftertreatment unit and the second aftertreatment unit each including: a first exhaust gas emission control system that is provided upstream in a flow direction of the exhaust gas; a second exhaust gas emission control system that is provided downstream of the first exhaust gas emission control system; and a communication pipe through which the first exhaust gas emission control system and the second exhaust gas emission control system are in communication with each other, the first and second exhaust gas emission control systems, while being arranged side by side in a right-and-left direction of the vehicle body, being oriented so that the flow direction of the exhaust gas flowing in the first and second exhaust gas emission control systems is parallel with the front-and-rear direction of the vehicle body, the communication pipe being provided between the first exhaust gas emission control system and the second exhaust gas emission control system, in which the first exhaust gas emission control system of the first aftertreatment unit and the first exhaust gas emission control system of the second aftertreatment unit are spaced from each other in the right-and-left direction of the vehicle body, the second exhaust gas emission control system of the first aftertreatment unit and the second exhaust gas emission control system of the second aftertreatment unit are provided between the first exhaust gas emission control system of the first aftertreatment unit and the first exhaust gas emission control system of the second aftertreatment unit, and when the exhaust gas aftertreatment device is seen in the front-and-rear direction of the vehicle body, an outer linear envelope that is tangent to the first exhaust gas emission control system and the communication pipe of each of the first aftertreatment unit and the second aftertreatment unit extends upward while tilting toward a right-and-left center of the engine.

In the first aspect, since the exhaust gas aftertreatment device includes at least one pair of first and second aftertreatment units, the exhaust gas aftertreatment device can deal with the exhaust gas discharged from a large-displacement engine without any difficulty and thus is reliably usable in a construction machine with such an engine. Further, the envelope that is tangent to the communication pipe and the first exhaust gas emission control system of each of the first and second treatment units extends upward while tilting toward the right-and-left center of the engine. Therefore, a slant surface can be formed on a hood or the like in accordance with the tilt angle of the envelop, so that an operator can reliably enjoy good visibility with the assistance of the slant surface.

According to a second aspect of the invention, the construction machine is a wheel loader, an air cleaner for intake air to be supplied to the engine is provided to the upper portion of the engine, and the exhaust gas aftertreatment device is closer to an operator's seat than the air cleaner.

In the second aspect, the exhaust gas aftertreatment device of the wheel loader is located closer to the operator's seat than the air cleaner similarly provided to the top of the engine. Therefore, the width of a rear portion of an engine compartment can be gradually reduced from near a rear end of the exhaust gas aftertreatment device, so that the vicinity of a rear wheel fender becomes more reliably visible.

According to a third aspect of the invention, the first aftertreatment unit and the second aftertreatment unit each further includes a urea supply device that is provided between the first exhaust gas emission control system and the communication pipe to supply a urea solution into the exhaust gas, the first exhaust gas emission control system of each of the first aftertreatment unit and the second aftertreatment unit includes a soot filter that is configured to collect particular matter in the exhaust gas, the second exhaust gas emission control system of each of the first aftertreatment unit and the second aftertreatment unit includes a urea reduction catalyst that is configured to reduce a nitrogen oxide in the exhaust gas using the urea solution, and the communication pipe is a mixing pipe in which the exhaust gas is mixed with the urea solution supplied by the urea supply device.

In the third aspect, the communication pipe functions as the mixing pipe in which the exhaust gas is mixed with the urea solution. Therefore, the exhaust gas favorably mixed with the urea solution can be evenly supplied to the entire inflow surface of each of the second exhaust gas emission control systems to accelerate purification of the exhaust gas.

DESCRIPTION OF EMBODIMENT(S)

An exemplary embodiment of the invention will be described below with reference to the attached drawings.

Figure 1A:
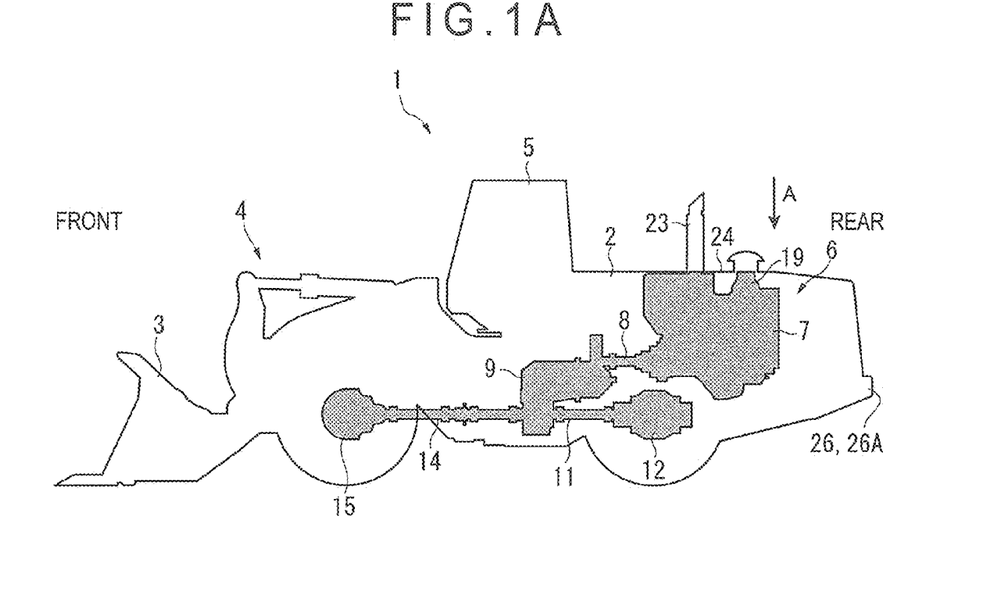
FIG. 1A is a schematic view showing a construction machine of an exemplary embodiment and a power transmission system thereof.
Figure 1B:
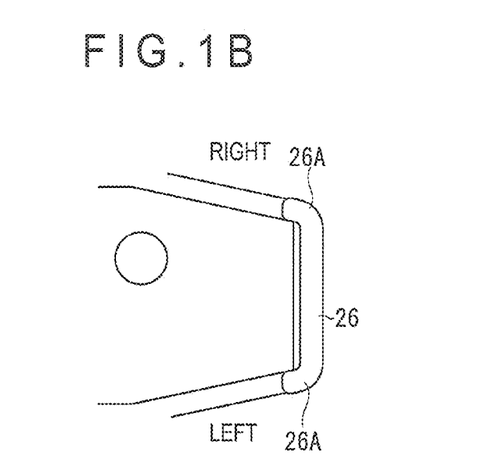
FIG. 1B shows a rear end of the construction machine seen in a direction of an arrow A in FIG. 1A.

FIG. 1A is a partially transparent view schematically showing a wheel loader 1 as a construction machine of the exemplary embodiment and a power transmission system thereof. FIG. 1B shows a rear end of the wheel loader 1 seen in a direction of an arrow A in FIG. 1A. It should be noted that a front-and-rear direction and a right-and-left direction hereinafter respectively mean the front-and-rear direction and the right-and-left direction defined when an operator is seated in a cab 5 shown in FIG. 1A.

As shown in FIG. 1A, the wheel loader 1 is substantially the same as a typical wheel loader except for an arrangement of an exhaust gas aftertreatment device 30 (described later) and for an external shape and the like depending on the arrangement of the exhaust gas aftertreatment device 30. Specifically, the wheel loader 1 includes: a vehicle body 2 including a front vehicle body and a rear vehicle body. A front portion of the front vehicle body is provided with an excavating/loading bucket 3 attached via a hydraulic working equipment drive mechanism 4 including a boom, a bell crank, a connecting link, a bucket cylinder and a boom cylinder.

The rear vehicle body includes a rear-vehicle-body frame formed of a thick metal plate or the like. A front portion of the rear-vehicle-body frame is provided with the box-shaped cab 5 in which an operator is to be seated and a rear portion of the rear-vehicle-body frame is provided with an engine compartment 6. In the engine compartment 6, a diesel engine (hereinafter simply referred to as engine) 7 as a power source is mounted. In the wheel loader 1, an axial direction of a crankshaft of the engine 7 is parallel with the front-and-rear direction of the vehicle body and a power from the engine 7 is outputted through an output shaft provided to a front of the engine 7.

The power outputted through the output shaft is transmitted to a transmission 9 through a propeller shaft 8. The power outputted from the transmission 9 is partly transmitted to a rear axle 12 through a rear drive shaft 11 and then to rear wheel(s). Similarly, the power outputted from the transmission 9 is partly transmitted to a front axle 15 through a front drive shaft 14 and then to front wheel(s). Further, the transmission 9 is provided with a PTO (Power Take Off) (not shown), through which the power transmitted through the propeller shaft 8 can be partly taken to drive a hydraulic pump or the like.

Figure 2:
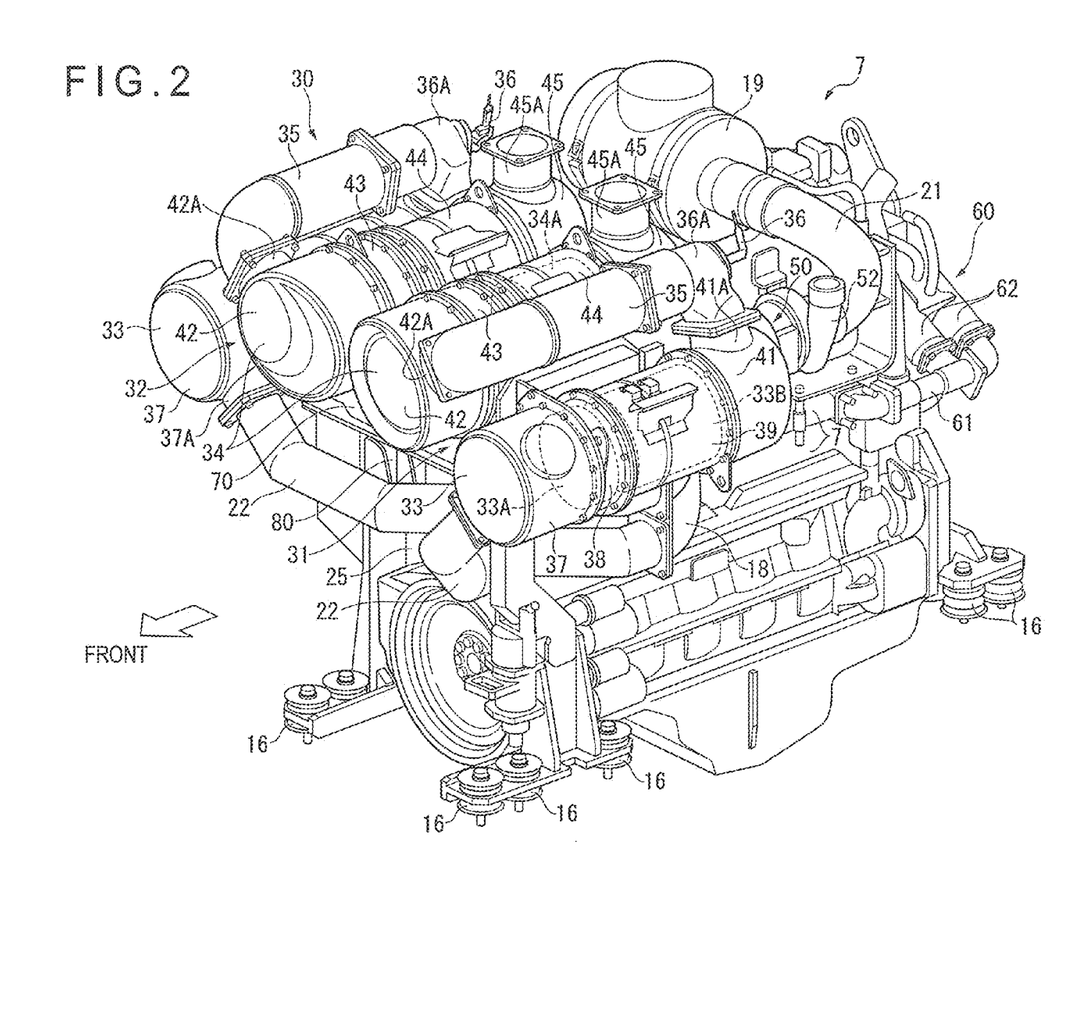
FIG. 2 is a perspective view showing an engine and an exhaust gas aftertreatment device installed in the construction machine.
Figure 3:
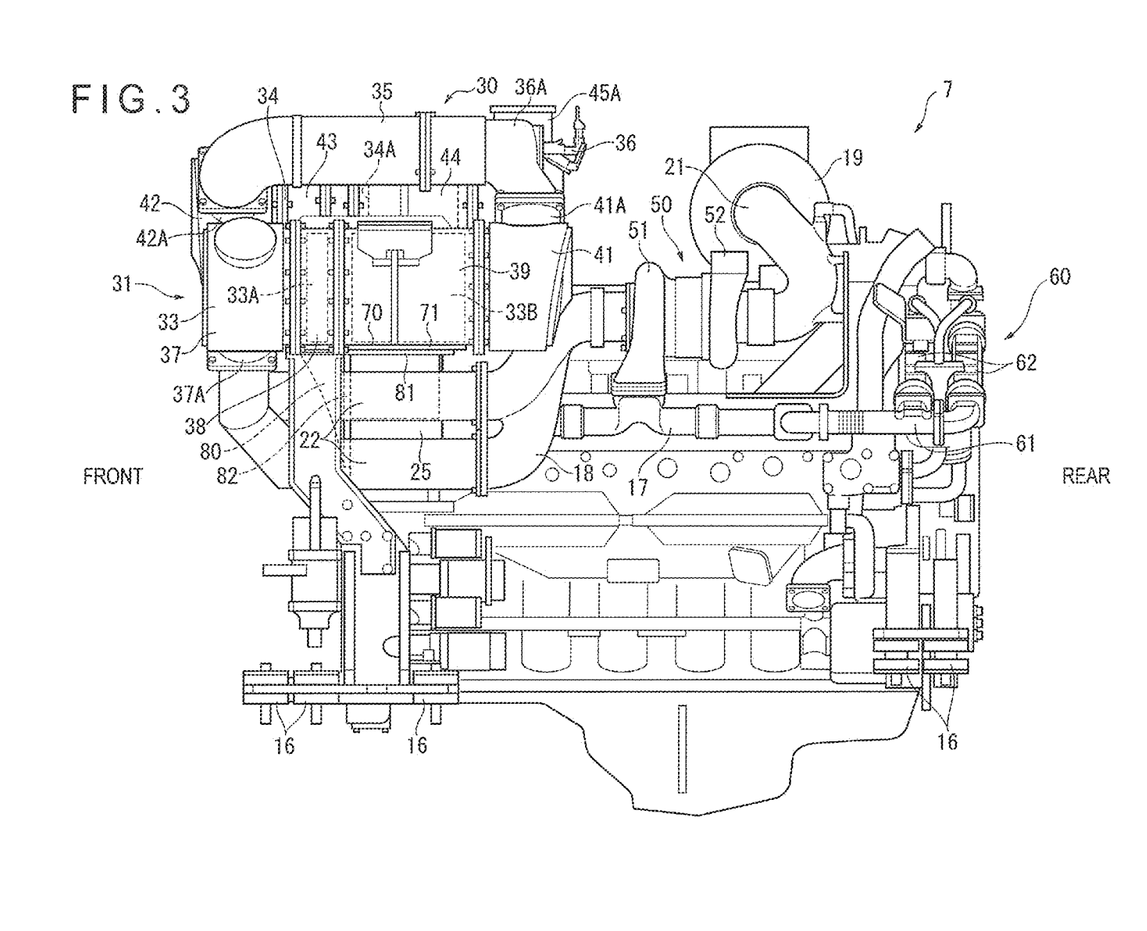
FIG. 3 is a front view showing the engine and the exhaust gas aftertreatment device.
Figure 4:
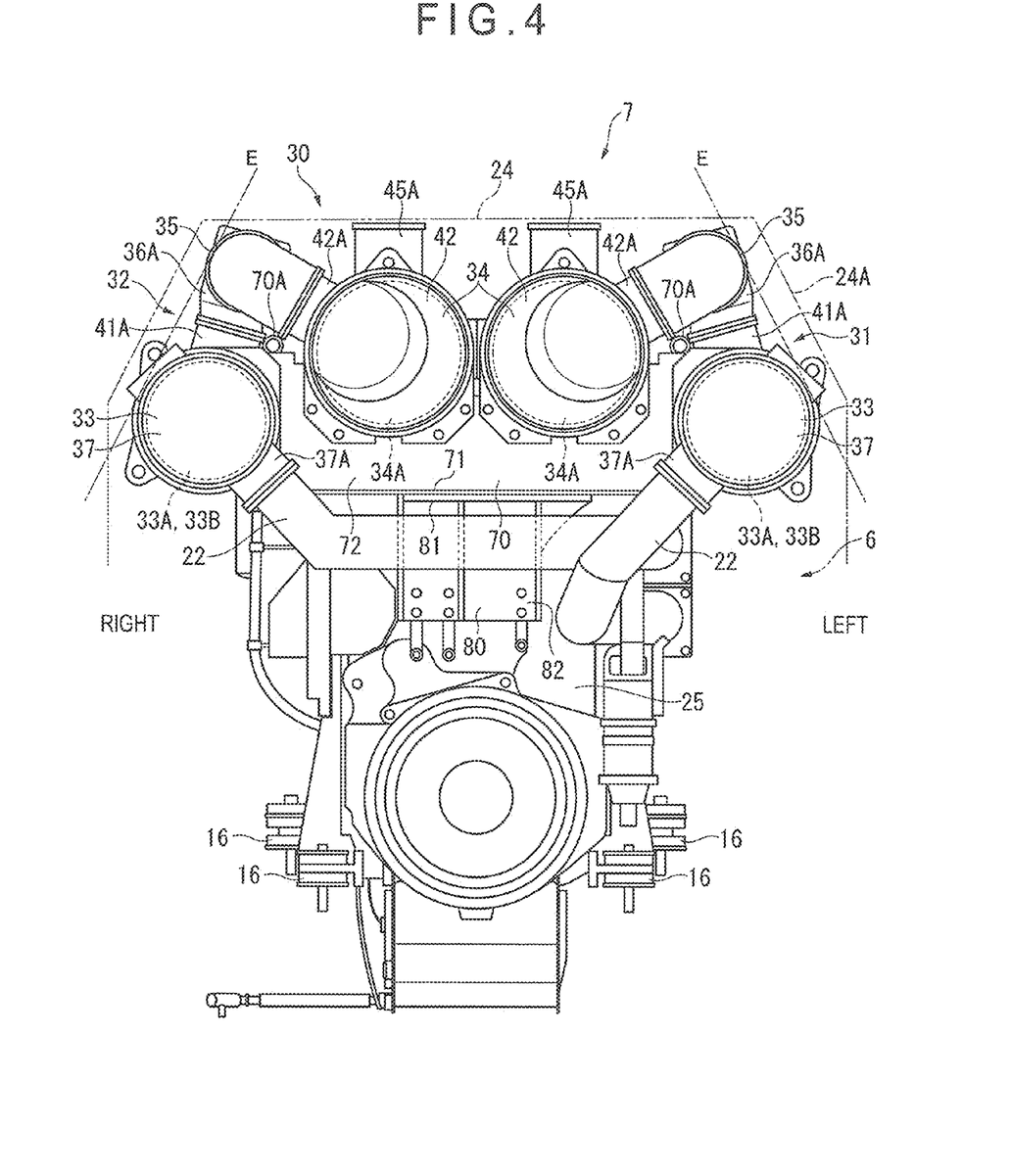
FIG. 4 is a side view seen from a front side of a vehicle body, showing the engine and the exhaust gas aftertreatment device.

FIG. 2 is a perspective view showing the engine 7 and the exhaust gas aftertreatment device 30 provided to the engine 7. FIG. 3 shows a side of the engine 7 and the exhaust gas aftertreatment device 30, on which an exhaust manifold 17 is provided. FIG. 4 shows another side of the engine 7 and the exhaust gas aftertreatment device 30, which is seen from the front portion of the vehicle body (i.e., in an axial direction of the output shaft).

As shown in FIGS. 2 to 4, in the engine compartment 6 (FIG. 1A), the engine 7 is mounted on the rear-vehicle-body frame via a plurality of rubber mounts 16. A turbocharger 50 driven by a kinetic energy of exhaust gas is provided to an upper portion of the engine 7 and substantially centered in the front-and-rear direction of the engine 7.

The exhaust manifold 17 provided to the engine 7 has an exhaust gas outlet connected to an inlet of a turbine housing 51 of the turbocharger 50. An outlet of the turbine housing 51 is connected to a branch pipe 18. A compressor housing 52 of the turbocharger 50 has an air inlet connected to an intake pipe 21 extending from an air cleaner 19 provided to an upper rear portion of the engine 7. The compressor housing 52 has an outlet that is in communication with an intake manifold via an intake pipe (not shown).

The engine 7 is further provided with an EGR (Exhaust Gas Recirculation) device 60. An EGR pipe 61 is connected to a rear portion of the exhaust manifold 17. A pair of EGR coolers 62, 62 are inserted side by side in the middle of the EGR pipe 61. An EGR valve (not shown) is provided to a portion of the EGR pipe 61 downstream in a flow direction of the exhaust gas relative to the EGR coolers 62. An end of the EGR pipe 61 is connected to the intake pipe through which the turbocharger 50 and the intake manifold are in communication with each other, so that the exhaust gas can be partially returned from the exhaust manifold 17 to an air intake system.

The branch pipe 18, which is connected to an exhaust side of the turbocharger 50, is also connected to a pair of exhaust pipes 22, 22. After passing through the exhaust pipes 22 and subsequently through the exhaust gas aftertreatment device 30, the exhaust gas is discharged out of the wheel loader 1 through a pair of tail pipes 23, 23 (one of them is shown in FIG. 1A).

The exhaust gas aftertreatment device 30 includes: a first aftertreatment unit 31 that is provided in front of the air cleaner 19 through which intake air is supplied to the engine 7 (i.e., near the cab 5 (i.e., an operator's seat) as shown in FIG. 1A) and at an upper-left shoulder of the engine 7; and a second aftertreatment unit 32 that is provided in front of the air cleaner 19 and at an upper-right shoulder of the engine 7. It should be noted that the term "shoulder" herein means an area defined along a corner between an upper face and a right or left face of a head cover of the engine 7. When the exhaust gas aftertreatment device 30 is provided near the operator's seat relative to the air cleaner 19, a rear width of the engine compartment 6 can be tapered from near a rear end of the exhaust gas aftertreatment device 30 irrespective of the presence of the first and second units 31, 32 (see FIG. 1B seen in an arrow A in FIG. 1A).

The first and second aftertreatment units 31, 32 each include: a first exhaust gas emission control system 33 provided upstream in the flow direction of the exhaust gas; a second exhaust gas emission control system 34 provided downstream in the flow direction; a mixing pipe 35 through which the first and second exhaust gas emission control systems 33, 34 are in communication with each other; and a urea supply device 36 that is provided between the first exhaust gas emission control system 33 and the mixing pipe 35 and includes an elbow pipe 36A.

While being arranged side by side in a width direction of the vehicle body (i.e., the right-and-left direction), the first and second exhaust gas emission control systems 33, 34 and the mixing pipe 35 are each oriented so that the flow direction of the exhaust gas flowing therein is parallel with the front-and-rear direction of the vehicle body (i.e., the axial direction of the crankshaft of the engine 7). The above arrangement will be described later in detail.

The first exhaust gas emission control system 33 basically includes: an oxidation catalyst 33A provided near an exhaust gas inlet of the first exhaust gas emission control system 33; a soot filter 33B provided downstream of the oxidation catalyst 33A; and a cylindrical case that houses the oxidation catalyst 33A and the soot filter 33B. Specifically, the first exhaust gas emission control system 33 includes: an inlet case 37 that includes an inflow pipe 37A connected to an end of corresponding one of the exhaust pipes 22; a catalyst case 38 that is provided downstream of the inlet case 37 to house the oxidation catalyst 33A; a filter case 39 that is provided downstream of the catalyst case 38 to house the soot filter 33B; and an outlet case 41 that is provided downstream of the filter case 39 and includes an outflow pipe 41A connected to a first end (upstream end) of the mixing pipe 35.

On the other hand, the second exhaust gas emission control system 34 basically includes a urea reduction catalyst 34A and a cylindrical case that houses the urea reduction catalyst 34A. Specifically, the second exhaust gas emission control system 34 includes: an inlet case 42 that includes an inflow pipe 42A connected to a second end (downstream end) of the mixing pipe 35; a buffer case 43 that is provided downstream of the inlet case 42 and has a hollow space defined as a buffer space for accelerating mixing; a catalyst case 44 that is provided downstream of the buffer case 43 to house the urea reduction catalyst 34A and an ammonia oxidation catalyst; and an outlet case 45 that is provided downstream of the catalyst case 44 and includes an outflow pipe 45A connected to a lower end of corresponding one of the tail pipes 23 (FIG. 1A). It should be noted that the ammonia oxidation catalyst (not shown) is housed downstream of the urea reduction catalyst 34A in the catalyst case 44.

In the first exhaust gas emission control system 33, the inflow pipe 37A of the inlet case 37 is attached on an outer circumferential surface of a body of the inlet case 37, so that the exhaust gas radially flows into the inlet case 37. Similarly, the outflow pipe 41A of the outlet case 41 is attached on an outer circumferential surface of a body of the outlet case 41, so that the exhaust gas radially flows out of the outlet case 41. Likewise, in the second exhaust gas emission control system 34, the inflow pipe 42A is attached on an outer circumferential surface of a body of the inlet case 42 and the outflow pipe 45A of the outlet case 45 is attached on an outer circumferential surface of a body of the outlet case 45, so that the exhaust gas radially flows in and out.

Further, in the first and second exhaust gas emission control systems 33, 34 of each of the first and second aftertreatment units 31, 32, the inlet cases 37, 42 are both located on a front side in the front-and-rear direction and the outlet cases 41, 45 are both located on a rear side in the front-and-rear direction. Accordingly, the mixing pipe 35 is arranged to extend from the rear side of the first exhaust gas emission control system 33 to the front side of the second exhaust gas emission control system 34. Therefore, when collectively seen in a plan view, the first exhaust gas emission control system 33, the mixing pipe 35 and the second exhaust gas emission control system 34 are arranged in such a manner that the exhaust gas sigmoidally flows therethrough.

The first and second aftertreatment units 31, 32 are provided at the right and left shoulders of the engine 7 in such a manner that the pair of first exhaust gas emission control systems 33 are spaced from each other in the right-and-left direction and the pair of second exhaust gas emission control systems 34 are located close to each other between the first exhaust gas emission control systems 33. The first exhaust gas emission control system 33 of each of the first and second aftertreatment units 31, 32 is laterally displaced from a position just above the engine 7 while being below the second exhaust gas emission control system 34 provided at a position just above the engine 7. The mixing pipe 35 is provided between the first and second exhaust gas emission control systems 33, 34 while being above the first exhaust gas emission control system 33.

Therefore, as shown by a chain line in FIG. 4, when the exhaust gas aftertreatment device 30 is seen in the front-and-rear direction, an outer linear envelope E that is tangent to an outer circumferential surface of the first exhaust gas emission control system 33 and an outer circumferential surface of the mixing pipe 35 of each of the first and second aftertreatment units 31, 32 extends upward while being tilted toward a right-and-left center of the engine 7. The tilt angle is the same as for the first and second aftertreatment units 31, 32 on the right and left sides. Further specifically, the envelope E is defined as a straight line tangent to an external portion of the outer circumferential surface of the mixing pipe 35 and an external portion of the outer circumferential surface of the first exhaust gas emission control system 33.

Therefore, as shown in a two-dot chain line in FIG. 4, a hood 24 that covers the engine compartment 6 may be configured to have right and left slant surfaces 24A. In this case, an operator in the cab can reliably enjoy a good rearward visibility. Specifically, without turning around to a great extent, the operator can easily see right and left ends 26A of a counterweight 26 provided to a rear end of the vehicle body (see FIG. 1B) and see a rear wheel fender over each of the slant surfaces 24A.

The first and second aftertreatment units 31, 32 are mounted on a support frame 70, which includes a bottom 71 and a plurality of elevational portions 72 projecting from the bottom 71, and fixed using an appropriate attachment. The support frame 70 is bolted to a flywheel housing 25 of the engine 7 via an attachment bracket 80 that includes a mount face 81 and an attachment face 82 projecting downward from the mount face 81.

The exhaust gas aftertreatment device 30, which includes the first and second aftertreatment units 31, 32, can be removed out of the engine compartment 6 for the purpose of maintenance or the like by detaching the support frame 70 and the attachment bracket 80 from each other, detaching the inflow pipe 37A and the exhaust pipe 22 of each of the first exhaust gas emission control systems 33 from each other and, for instance, craning up the exhaust gas aftertreatment device 30 along with the support frame 70 using a hang bolt 70A (FIG. 4) provided to the support frame 70.

Incidentally, instead of the above arrangement, the support frame 70 may have a two-dividable structure for the first and second aftertreatment units 31, 32 so that the first and second aftertreatment units 31, 32 can be independently removed.

Alternatively, the vehicle body fame and the rubber mounts 16 may be detached from each other so that the engine 7 can be lifted to be removed along with the exhaust gas aftertreatment device 30, the turbocharger 50, the EGR device 60, the air cleaner 19 and the like to be removed.

When the exhaust gas aftertreatment device 30 of the exemplary embodiment is used, the exhaust gas discharged from the turbocharger 50 dividedly flows into the exhaust pipes 22 through the branch pipe 18 and supplied to the second aftertreatment units 31, 32.

Specifically, the exhaust pipes 22 connected to the branch pipe 18 each include: a first end portion that is provided at a lateral side of the engine 7 and below the first exhaust gas emission control system 33 of the first aftertreatment unit 31; and a second end portion that is curved to extend in front of the flywheel housing 25 and is connected to the inflow pipe 37A of corresponding one of the first exhaust gas emission control systems 33 from obliquely below. With this arrangement, the exhaust gas radially flows into the first exhaust gas emission control systems 33 from below through the exhaust pipes 22. Then, in the first exhaust gas emission control systems 33, the direction of the exhaust gas is changed to the longitudinal direction and the exhaust gas flows into the oxidation catalysts 33A.

After the exhaust gas passes through the oxidation catalysts 33A, particular matter in the exhaust gas is collected by the soot filters 33B. The exhaust gas then radially flows out of the first exhaust gas emission control systems 33 through the outflow pipes 41A and flows into the elbow pipes 36A. In the elbow pipe 36A, the urea solution is sprayed into the exhaust gas from the urea supply device 36. While passing through the mixing pipes 35, in which the flow direction is again changed to the front-and-rear direction, the exhaust gas is well mixed with the sprayed urea solution. The exhaust gas then radially flows into the second exhaust gas emission control systems 34 through the inflow pipe 42A.

In the second exhaust gas emission control systems 34, in which the flow direction is again changed to the front-and-rear direction, the exhaust gas is evenly supplied to inflow surfaces of the urea reduction catalysts 34A after passing through the buffer spaces. While passing through the urea reduction catalysts 34A, an NOx is reduced so that the exhaust gas becomes harmless. After becoming harmless, the exhaust gas radially flows out of the second exhaust gas emission control systems 34 through the outflow pipes 45A and is discharged out of the wheel loader 1 through the tail pipes 23. It should be noted that even when the urea reduction catalysts 34A fail to fully remove ammonia due to, for instance, an excessive sprayed amount of the urea solution, such residual ammonia is decomposed by the ammonia oxidation catalysts, thereby preventing diffusion of the ammonia into the air.

In order to burn out the particular matter collected by the soot filters 33B to regenerate the soot filters 33B, a dosing fuel, which may be the same as a fuel for the engine 7, is supplied into the exhaust gas on an upstream of the oxidation catalysts 33A so that the temperature of the exhaust gas is increased to an activating temperature of the soot filters 33B as a result of oxidation of the dosing fuel through the oxidation catalysts 33A. When the thus-heated exhaust gas passes through the soot filters 33B, the particular matter collected in the soot filters 33B is burned out to be harmless and then discharged out along with the exhaust gas. The soot filters 33B can thus self-regenerate to a state without any particular matter.

The exhaust gas aftertreatment device 30 as described above includes the first and second aftertreatment units 31, 32, which in combination exhibit a performance sufficient for the engine 7 with a large displacement, so that the exhaust gas aftertreatment device 30 can deal with a large amount of exhaust gas as compared with a typical exhaust gas aftertreatment device installed in an on-road transport truck or the like. Further, as long as the first and second exhaust gas emission control systems 33, 34 of the first and second aftertreatment units 31, 32 are arranged relative to the engine 7 as described above, an operator can enjoy a good rearward visibility.

Incidentally, it should be understood that the scope of the invention is not limited to the above-described exemplary embodiment(s) but includes modifications and improvements as long as an object of the invention is achievable.

Figure 5:
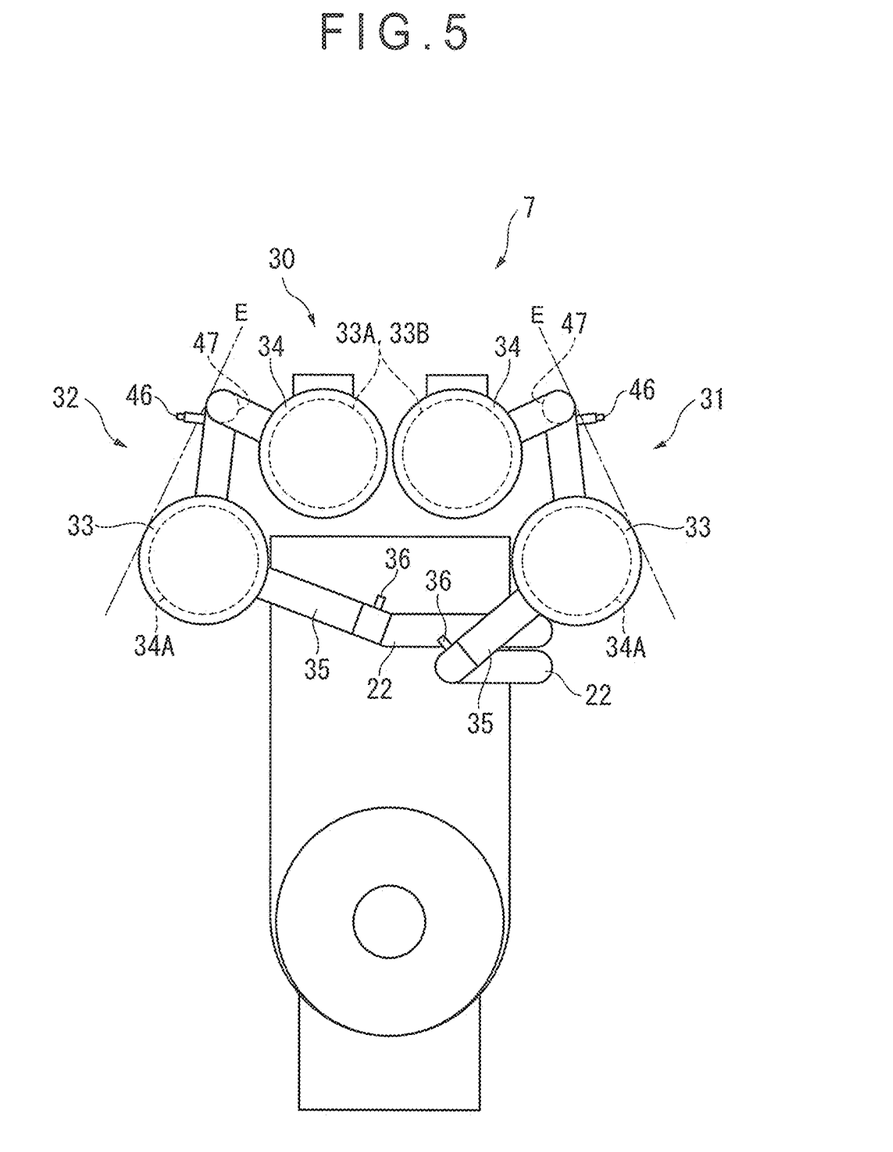
FIG. 5 is a side view schematically showing a modification of the invention.

For instance, in the exemplary embodiment, the first exhaust gas emission control systems 33 each include the oxidation catalyst 33A and the soot filter 33B while the second exhaust gas emission control systems 34 each include the urea reduction catalyst 34A. This arrangement may be replaced by an arrangement where the first exhaust gas emission control systems 33 on the upstream side each include the urea reduction catalyst 34A while the second exhaust gas emission control systems 34 on the downstream side each include the oxidation catalyst 33A and the soot filter 33B as shown in FIG. 5. In this case, the urea supply device 36 and the mixing pipe 35 of each of the first and second aftertreatment units 31, 32 are provided upstream of each of the first exhaust gas emission control systems 33. Further, a fuel supply device 46 for supplying the dosing fuel is provided between the communication pipe of the invention and the first exhaust gas emission control system 33 of each of the first and second aftertreatment units 31, 32 and the communication pipe of the invention functions as a mixing pipe 47 for the dosing fuel and the exhaust gas.

It should be noted that the fuel supply device for the dosing fuel and the oxidation catalyst 33A are optionally provided to each of the first and second aftertreatment units 31, 32 irrespective of the position of each of the soot filter 33B and the urea reduction catalyst 34A (i.e., upstream side or downstream side), and thus the fuel supply device and the oxidation catalyst 33A may not be provided without departing the scope of the invention.

Although the exhaust gas aftertreatment device 30 includes the first and second aftertreatment units 31, 32 in the exemplary embodiment, the exhaust gas aftertreatment device 30 may include three or more aftertreatment units without departing the scope of the invention. As long as two or more units are provided, the number of the units may be appropriately determined depending on the performance of each unit and engine displacement. Incidentally, when three units are provided, two of them arranged on both sides in the right-and-left direction are defined as the first and second aftertreatment units of the invention.

Although the construction machine of the invention is exemplified by a wheel loader and an advantage of the invention is explained in terms of the rearward visibility of an operator in the exemplary embodiment, the invention may be applied to a bulldozer to improve a forward visibility from the bulldozer so that the progress of work can easily and well checked during the use of a blade.

The invention claimed is:

1. A construction machine comprising:
   an engine that is oriented so that an axial direction of a crankshaft is parallel with a front-and-rear direction of a vehicle body; and
   an exhaust gas aftertreatment device that is provided to an upper portion of the engine in an engine compartment covered by a hood, the exhaust gas aftertreatment device comprising at least one pair of a first aftertreatment unit and a second aftertreatment unit into which exhaust gas from the engine dividedly flows, the first aftertreatment unit and the second aftertreatment unit each comprising:
   a first exhaust gas emission control system that is provided upstream in a flow direction of the exhaust gas;
   a second exhaust gas emission control system that is provided downstream of the first exhaust gas emission control system; and
   a communication pipe through which the first exhaust gas emission control system and the second exhaust gas emission control system are in communication with each other, the first and second exhaust gas emission control systems, while being arranged side by side in a right-and-left direction of the vehicle body, being oriented so that the flow direction of the exhaust gas flowing in the first and second exhaust gas emission control systems is parallel with the front-and-rear direction of the vehicle body, and the communication pipe being provided between the first exhaust gas emission control system and the second exhaust gas emission control system,
   wherein the first exhaust gas emission control system of the first aftertreatment unit and the first exhaust gas emission control system of the second aftertreatment unit are spaced from each other in the right-and-left direction of the vehicle body,
   wherein the second exhaust gas emission control system of the first aftertreatment unit and the second exhaust gas emission control system of the second aftertreatment unit are provided between the first exhaust gas emission control system of the first aftertreatment unit and the first exhaust gas emission control system of the second aftertreatment unit,
   wherein when the exhaust gas aftertreatment device is seen in the front-and-rear direction of the vehicle body, an outer linear envelope that is tangent to the first exhaust gas emission control system and the communication pipe of each of the first aftertreatment unit and the second aftertreatment unit extends upward while tilting toward a right-and-left center of the engine, and
   wherein a slant surface along the envelope is provided to the hood at a position corresponding to: a portion facing an external portion of an outer circumferential surface of the communication pipe of each of the first aftertreatment unit and the second aftertreatment unit, and a portion facing an external portion of an outer circumferential surface of the first exhaust gas emission control system of each of the first aftertreatment unit and the second after treatment unit.

2. The construction machine according to claim 1, wherein:
   the construction machine is a wheel loader,
   an air cleaner for intake air to be supplied to the engine is provided to the upper portion of the engine, and
   the exhaust gas aftertreatment device is closer to an operator's seat than the air cleaner.

3. The construction machine according to claim 1, wherein
   the first aftertreatment unit and the second aftertreatment unit each further comprises a urea supply device that is provided between the first exhaust gas emission control system and the communication pipe to supply a urea solution into the exhaust gas,
   the first exhaust gas emission control system of each of the first aftertreatment unit and the second aftertreatment unit comprises a soot filter that is configured to collect particular matter in the exhaust gas,
   the second exhaust gas emission control system of each of the first aftertreatment unit and the second aftertreatment unit comprises a urea reduction catalyst that is configured to reduce a nitrogen oxide in the exhaust gas using the urea solution, and
   the communication pipe comprises a mixing pipe in which the exhaust gas is mixed with the urea solution supplied by the urea supply device.

4. The construction machine according to claim 2, wherein:
   the first aftertreatment unit and the second aftertreatment unit each further comprises a urea supply device that is provided between the first exhaust gas emission control system and the communication pipe to supply a urea solution into the exhaust gas,
   the first exhaust gas emission control system of each of the first aftertreatment unit and the second aftertreatment unit comprises a soot filter that is configured to collect particular matter in the exhaust gas,
   the second exhaust gas emission control system of each of the first aftertreatment unit and the second aftertreatment unit comprises a urea reduction catalyst that is configured to reduce a nitrogen oxide in the exhaust gas using the urea solution, and
   the communication pipe comprises a mixing pipe in which the exhaust gas is mixed with the urea solution supplied by the urea supply device.

5. The construction machine according to claim 1, wherein:
   the construction machine is a wheel loader comprising a cab, and
   the engine compartment is provided behind the cab.

* * * * *